(12) United States Patent
Kim et al.

(10) Patent No.: US 12,252,187 B2
(45) Date of Patent: Mar. 18, 2025

(54) STEER-BY-WIRE TYPE STEERING DEVICE

(71) Applicant: HL MANDO CORPORATION, Gyeonggi-do (KR)

(72) Inventors: EungSu Kim, Gyeonggi-do (KR); Hong Eun Choi, Gyeonggi-do (KR)

(73) Assignee: HL Mando Corporation, Gyeonggi-do (KR)

( * ) Notice: Subject to any disclaimer, the term of this patent is extended or adjusted under 35 U.S.C. 154(b) by 407 days.

(21) Appl. No.: 17/899,033

(22) Filed: Aug. 30, 2022

(65) Prior Publication Data

US 2023/0063267 A1 Mar. 2, 2023

(30) Foreign Application Priority Data

Aug. 31, 2021 (KR) .................. 10-2021-0115904

(51) Int. Cl.
*B62D 5/00* (2006.01)
(52) U.S. Cl.
CPC ................... *B62D 5/001* (2013.01)
(58) Field of Classification Search
CPC ..................................................... B62D 5/001
See application file for complete search history.

(56) References Cited

U.S. PATENT DOCUMENTS

2022/0144335 A1\* 5/2022 Hong ..................... B62D 5/006

FOREIGN PATENT DOCUMENTS

| DE | 10 2015 120 207 | | 5/2017 |
|---|---|---|---|
| JP | 2010-52628 | | 3/2010 |
| KR | 20090007104 A | \* | 1/2009 |
| WO | 2020/184857 | | 9/2020 |

OTHER PUBLICATIONS

Office Action issued on Feb. 6, 2023 for German Patent Application No. 10 2022 122 006.0 and its English translation by Google Translate.

\* cited by examiner

*Primary Examiner* — Kevin Hurley
(74) *Attorney, Agent, or Firm* — WOMBLE BOND DICKINSON (US) LLP

(57) ABSTRACT

According to the present embodiments, it is possible to enhance the driver's steering feel by limiting the maximum steering angle of the steering wheel and easily change the maximum steering angle of the steering wheel in real-time or with a minimum structure change as necessary.

12 Claims, 12 Drawing Sheets

STEER-BY-WIRE TYPE STEERING DEVICE

CROSS-REFERENCE TO RELATED APPLICATION

This application claims priority from Korean Patent Application No. 10-2021-0115904, filed on Oct. 31, 2021, which is hereby incorporated by reference for all purposes as if fully set forth herein.

BACKGROUND

Field

The present embodiments relate to a steer-by-wire steering device and, more specifically, to a steer-by-wire steering device capable of enhancing the driver's steering feel by limiting the maximum steering angle of the steering wheel and easily changing the maximum steering angle of the steering wheel in real-time or with a minimum structure change as necessary.

Description of Related Art

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

Due to lack of a mechanical connection between the steering shaft and wheel, such a steer-by-wire steering device typically has a separate device for stopping the driver from further rotation of the steering wheel beyond the maximum steering angle.

Meanwhile, the maximum steering angle needs to be set to differ depending on the type of the vehicle to provide a steering feel appropriate for the vehicle. To change the maximum steering angle in the rotation limiting device provided in the conventional steer-by-wire steering device, the structure itself remains the same, but the specifications of each part need to be changed, resulting in the need for changing the design of the rotation limiting device.

Further, the rotation limiting device provided in the conventional steer-by-wire steering device is unable to change the initially set maximum steering angle and thus cannot provide the optimal maximum steering angle to the driver in real-time according to, e.g., the vehicle driving mode.

BRIEF SUMMARY

The present embodiments have been conceived in the foregoing background and relate to a steer-by-wire steering device capable of enhancing the driver's steering feel by limiting the maximum steering angle of the steering wheel and easily changing the maximum steering angle of the steering wheel in real-time or with a minimum structure change as necessary.

According to the present embodiments, there may be provided a steer-by-wire steering device comprising a steering shaft having gear teeth on an outer circumferential surface thereof, a first gear rotated in engagement with the gear teeth of the steering shaft, a second gear having an inner circumferential surface engaged with the first gear, a housing supporting rotation of the second gear, a first stopper provided on the first gear and supported by the steering shaft or the second gear as the first gear rotates, a second stopper provided on the second gear, and a third stopper provided in the housing and supporting the second stopper as the second gear rotates.

According to the present embodiments, it is possible to enhance the driver's steering feel by limiting the maximum steering angle of the steering wheel and easily change the maximum steering angle of the steering wheel in real-time or with a minimum structure change as necessary.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
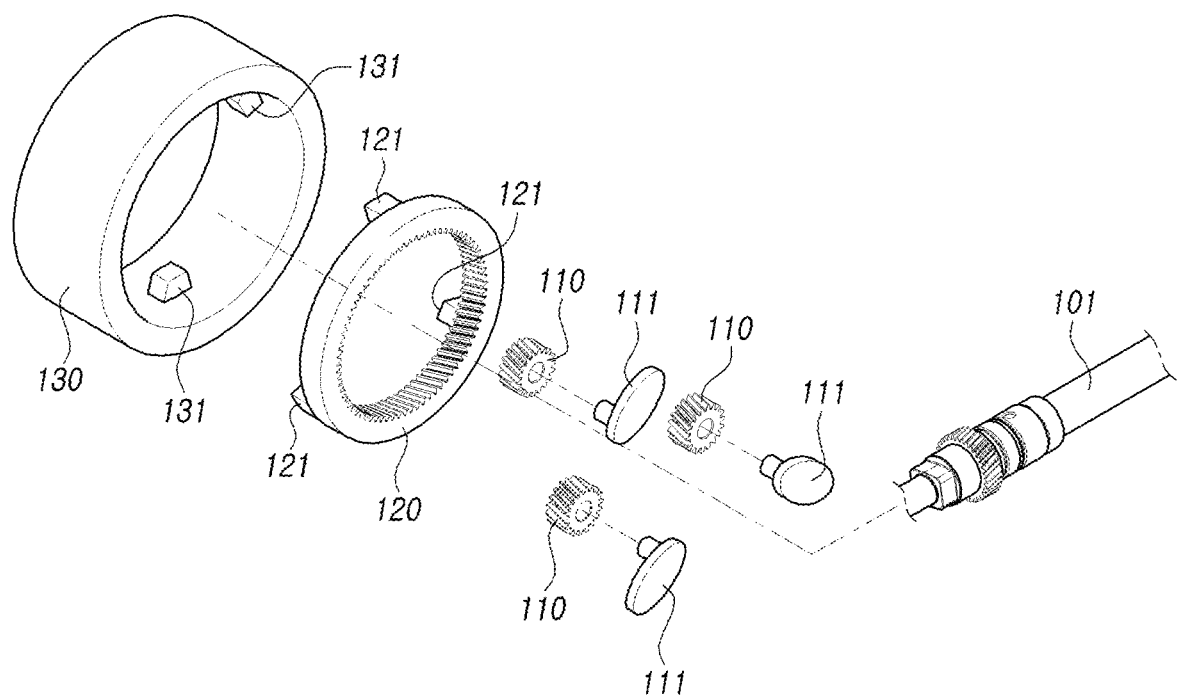
FIG. 1 is an exploded perspective view illustrating a steer-by-wire steering device according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
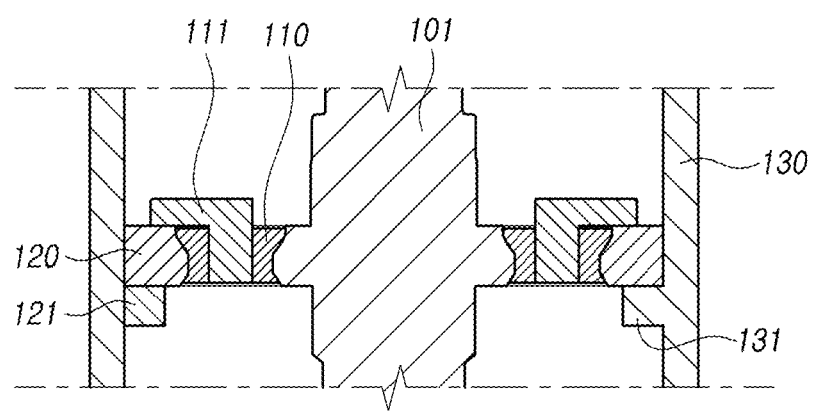
FIG. 2 is a side cross-sectional view illustrating an assembled state of FIG. 1.
Figure 3:
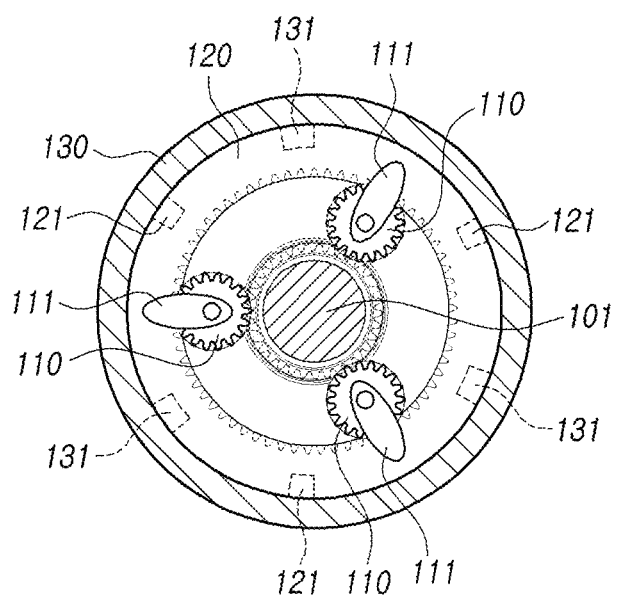
FIG. 3 is a front view illustrating a combined state of FIG. 1.
Figure 4:
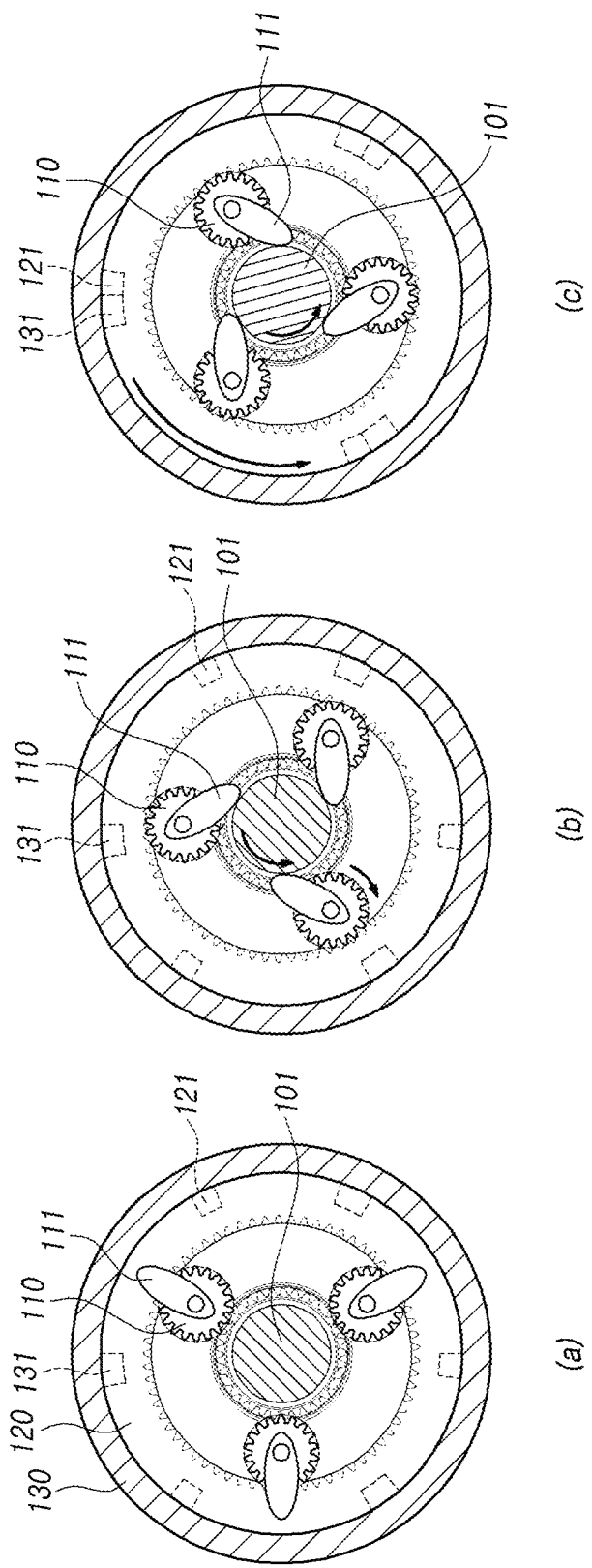
FIG. 4 is a view illustrating an operational state of a steer-by-wire steering device according to the present embodiments.
Figure 8:
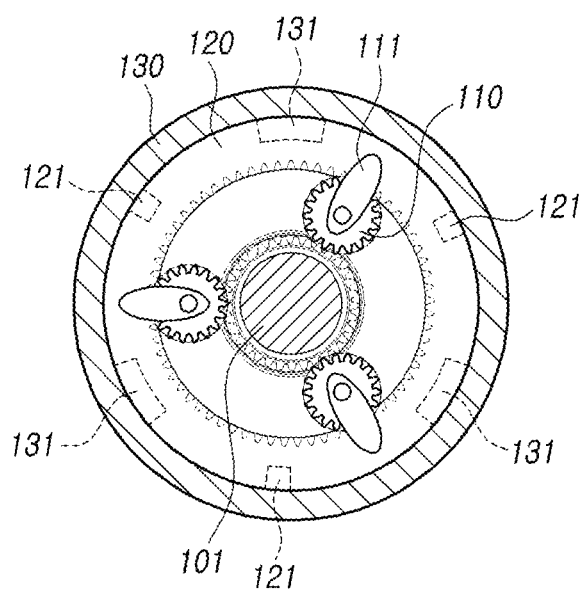
Figure 9:
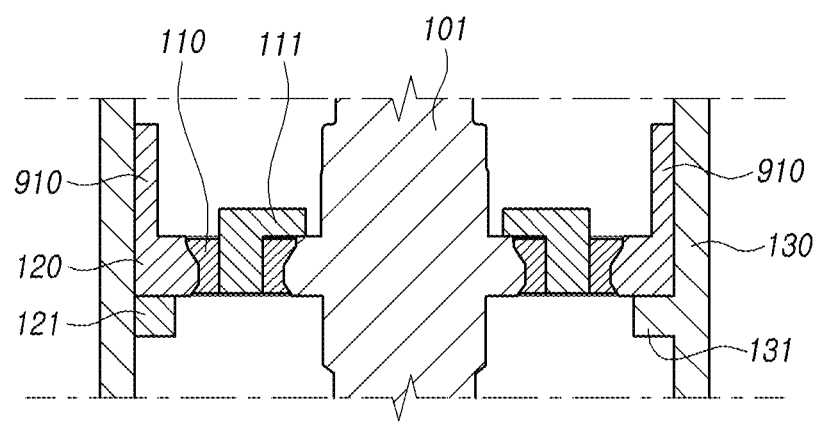
FIG. 9 is a side cross-sectional view illustrating a steer-by-wire steering device according to the present embodiments.
Figure 10:
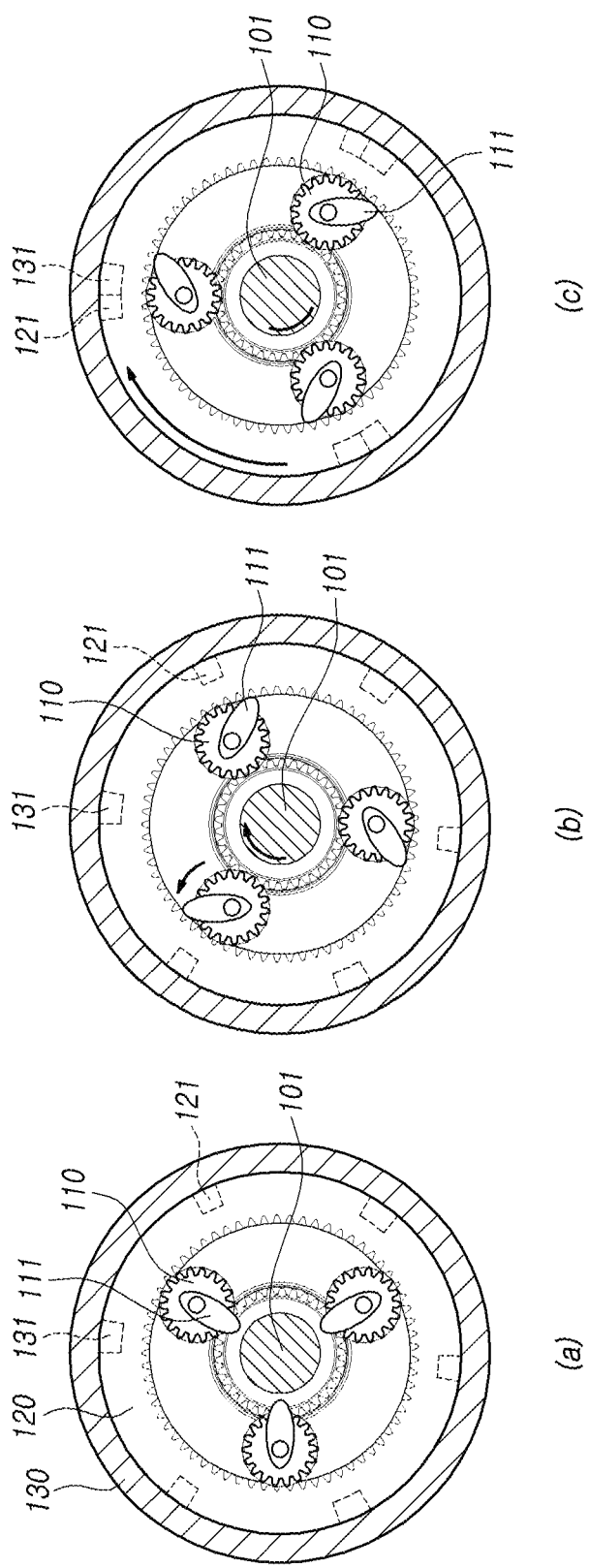
FIG. 10 is a view illustrating an operational state of a steer-by-wire steering device according to the present embodiments.
Figure 11:
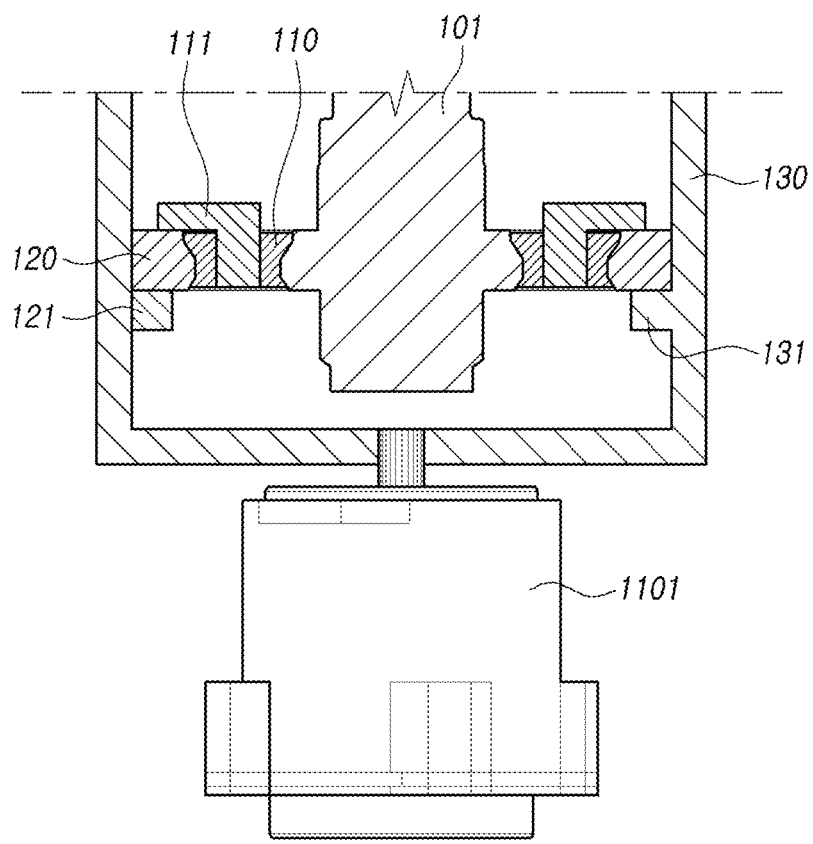
FIG. 11 is a side cross-sectional view illustrating a steer-by-wire steering device according to the present embodiments.
Figure 12:
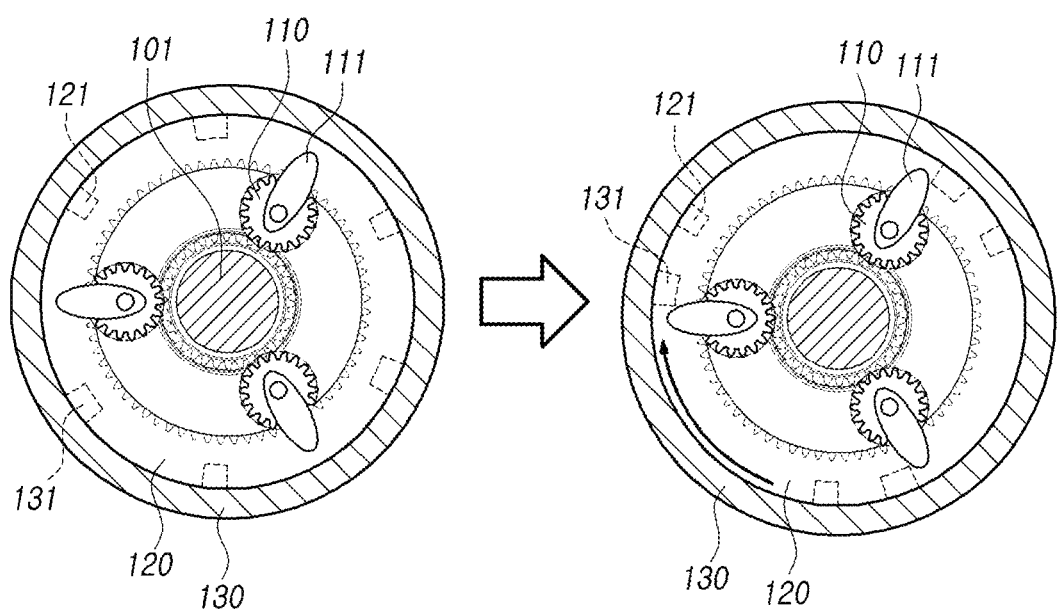
FIG. 12 is a view illustrating an operational state of a steer-by-wire steering device according to the present embodiments.

FIG. 1 is an exploded perspective view illustrating a steer-by-wire steering device according to the present embodiments. FIG. 2 is a side cross-sectional view illustrating an assembled state of FIG. 1. FIG. 3 is a front view illustrating a combined state of FIG. 1. FIG. 4 is a view illustrating an operational state of a steer-by-wire steering device according to the present embodiments. FIGS. 5 to 8 are front views illustrating a steer-by-wire steering device according to the present embodiments. FIG. 9 is a side cross-sectional view illustrating a steer-by-wire steering device according to the present embodiments. FIG. 10 is a view illustrating an operational state of a steer-by-wire steering device according to the present embodiments. FIG. 11 is a side cross-sectional view illustrating a steer-by-wire steering device according to the present embodiments. FIG. 12 is a view illustrating an operational state of a steer-by-wire steering device according to the present embodiments.

According to the present embodiments, a steer-by-wire steering device 100 comprises a steering shaft 101 having gear teeth on an outer circumferential surface thereof, a first gear 110 rotated in engagement with the gear teeth of the steering shaft 101, a second gear 120 having an inner circumferential surface engaged with the first gear 110, a housing 130 supporting rotation of the second gear 120, a first stopper 111 provided on the first gear 110 and supported by the steering shaft 101 or the second gear 120 as the first gear 110 rotates, a second stopper 121 provided on the second gear 120, and a third stopper 131 provided in the housing 130 and supporting the second stopper 121 as the second gear 120 rotates.

The steer-by-wire steering device 100 is described below with reference to FIGS. 1 to 4.

The steering shaft 101 has gear teeth formed on its outer circumferential surface to mesh with the first gear 110, and accordingly, as the steering shaft 101 rotates, the first gear and the second gear 120 are rotated. The rotation ranges of the first gear and the second gear 120 may be limited by the first to third stoppers 111, 121, and 131, so that the maximum steering angle of the steering wheel may be limited, and the driver's steering feel may be enhanced.

As is described below in detail, the rotation range of the steering shaft 101 is determined by a relative rotation range between the steering shaft 101 and the first gear 110 and a relative rotation range between the second gear 120 and the housing 130. By adjusting the relative rotation range between the second gear 120 and the housing 130, the rotation range of the steering shaft 101 may be changed.

The first gear 110 meshes with the gear teeth formed on the outer circumstantial surface of the steering shaft 101, and the second gear 120 is provided coaxially with the steering shaft 101 so that the inner circumstantial surface of the second gear teeth meshes with the first gear 110. Accordingly, as the steering shaft 101 is rotated, the first gear 110 rotates and revolves between the outer circumstantial surface of the steering shaft 101 and the inner circumstantial surface of the second gear 120. A plurality of first gears 110 may be provided, and the first stopper 111 may be coupled to each of the plurality of first gears 110. The drawings illustrate an embodiment in which three first gears 110 are provided.

The first stopper 111 is provided on the first gear 110 and is fixed in the circumferential direction with respect to the first gear 110. Accordingly, the first stopper 111 is rotated together with the first gear 110. As the first gear 110 rotates, the first stopper 111 is supported on the inner surface of the second gear 120 or the steering shaft 101 so that the rotation of the first gear 110 is limited.

An end of the first stopper 111 radially protrudes beyond the outer circumstantial surface of the first gear 110. As the first gear 110 rotates, the end of the first stopper 111 is rotated along a concentric circle having a larger radius than the outer circumferential surface of the first gear 110. Accordingly, the first stopper 111 is supported on the inner surface of the second gear 120 or the steering shaft 101 so that the rotation of the first gear 110 is limited.

The first stopper 111 may be integrally formed with the first gear 110. Alternatively, as shown in the drawings, there may be provided a shaft part and a support part, the shaft portion may be coupled to the first gear 110, and an end of the support part may radially protrude beyond the outer circumstantial surface of the first gear 110. Although the drawings illustrate an embodiment in which the support part has an elliptical shape, it is not necessarily limited thereto. Although the drawings illustrate an embodiment in which the first stopper 111 may include one support part, the first stopper 111 may include a plurality of support parts, and an end of each support part may radially protrude beyond the outer circumferential surface of the first gear 110.

FIGS. 1 to 4 illustrate an embodiment in which as the first gear 110 rotates, the first stopper 111 is not supported by the second gear 120 but is supported by the steering shaft 101 so that the relative rotation between the steering shaft 101 and the first gear 110 is limited.

FIG. 4 illustrates an embodiment in which as the steering shaft 101 rotates counterclockwise as viewed in the drawings, the first gear 110 is rotated clockwise so that the first stopper 111 is supported by the steering shaft 101. If the first stopper 111 is supported by the steering shaft 101, the first gear 110 is stopped from further rotation, and the relative rotation between the steering shaft 101 and the first gear 110 is limited. Although the drawings illustrate that after rotation of the first gear 110 about the steering shaft 101 is limited, the second gear 120 is rotated, it is merely for convenience of illustration and understanding, rotation of the first gear 110 about the steering shaft 101 and rotation of the second gear 120 may simultaneously be performed.

The range of relative rotation between the steering shaft 101 and the first gear 110 may be designed to differ depending on, e.g., the outer diameter of the steering shaft 101, the shape and inner diameter of the second gear 120, and the shape of the first stopper 111.

FIGS. 9 and 10 illustrate an embodiment in which the support part of the first stopper 111 is formed to be shorter than that in the embodiment illustrated in FIGS. 1 to 4, and an extension 910 axially extending is provided in the second gear 120. In this structure, the first stopper 111 is not supported by the steering shaft 101 but is supported only by the second gear 120, so that the relative rotation between the steering shaft 101 and the first gear 110 may be limited.

The extension 910 may be formed to axially extend from the side surface opposite to the surface where the second stopper 121 of the second gear 120 is provided. As the support part of the first stopper 111 is formed to be shorter than that in the embodiment illustrated in FIGS. 1 to 4, the first stopper 111 is not supported by the steering shaft 101 but may be supported only by the extension 910 of the second gear 120 when the first gear 110 is rotated.

According to another embodiment, when the first gear 110 is rotated in one direction, the first stopper 111 is supported by the steering shaft 101 and, when the first gear 110 is rotated in the opposite direction, the first stopper 111 may be supported by the second gear 120. Alternatively, as the first gear 110 is rotated, the first stopper 111 may be supported simultaneously by the steering shaft 101 and the second gear 120.

As such, it is possible to change the maximum steering angle by changing the way in which the first stopper 111 is supported.

Referring back to FIGS. 1 to 4, as the steering shaft 101 is rotated, the second gear 120 is rotated about the housing 130. As the second stopper 121 provided on the second gear 120 is supported by the third stopper 131 provided in the housing 130, the relative rotation between the second gear 120 and the housing 130 is limited.

Rotation of the second gear 120 is supported by the housing 130. The housing 130 may be formed in a cylindrical shape as shown in the drawings, and the outer circumferential surface of the second gear 120 may be supported on the inner surface of the housing 130. The housing 130 may further include, e.g., a bearing or support part for supporting rotation of the second gear 120, which is omitted in the drawings for convenience of illustration.

The housing 130 may be fixed to the vehicle body or, as shown in FIGS. 11 and 12, the housing 130 may be provided to be rotatable by the motor 1101.

As the second gear 120 is rotated, the second stopper 121 and the third stopper 131 are supported by each other. The second stopper 121 may be formed to axially protrude from the second gear 120, and the third stopper 131 may be formed to radially protrude from the inner circumferential surface of the housing 130.

As described below, it is possible to change the maximum steering angle of the steering wheel by changing the shape, number, or placement of the second stopper 121 or the third stopper 131. Accordingly, at least one of the second stopper 121 or the third stopper 131 should be provided in a replaceable form. The drawings illustrate an embodiment in which the second stopper 121 is formed separately from the second gear 120 and is coupled to the second gear 120, and the third stopper 131 is integrally formed with the housing 130. According to another embodiment, the second stopper 121 may be integrally formed with the second gear 120 while the third stopper 131 may be formed separately from the housing 130. Alternatively, the second stopper 121 and the third stopper 131 both may be formed separately from the second gear 120 and the housing 130.

Although how to couple the second stopper 121 and the second gear 120 for convenience of illustration is omitted in the drawings, they may be coupled together via, e.g., screwing. The way in which the second stopper 121 and the second gear 120 are coupled and the way in which the third stopper 131 and the housing 130 do not limit the present embodiments, and it suffices that the stopper is coupled in a replaceable form.

The second gear 120 may be formed to be able to provide various coupling positions to the second stopper 121. It is possible to adjust the gap between the second stopper 121 and the third stopper 131 and the maximum steering angle by changing the placement of the second stopper 121 on the second gear 120 or replacing it with a stopper with a different shape. The same applies even where the third stopper 131 is formed separately from the housing 130.

Referring to FIGS. 2 and 3, the support part of the first stopper 111 and the second stopper 121 and third stopper 131 may be positioned on opposite sides of the body part of the second gear 120. Accordingly, when the first stopper 111 is rotated, an end thereof may not be supported by the second stopper 121 or the third stopper 131. However, the second stopper 121 and third stopper 131 are not limited in position and shape thereto as long as they are supported by each other when the second gear 120 is rotated about the housing 130.

FIG. 4(a) illustrates a neutral steering state, FIG. 4(b) illustrates a state in which the first stopper 111 is supported by the steering shaft 101, and FIG. 4(c) illustrates a state in which the steering wheel reaches the maximum steering angle.

FIG. 10(a) illustrates a neutral steering state, FIG. 10(b) illustrates a state in which the first stopper 111 is supported by the second gear 120, and FIG. 10(c) illustrates a state in which the steering wheel reaches the maximum steering angle.

In other words, as the driver rotates the steering wheel, the first gear 110 and the second gear 120 change from state (a) to state (c). For convenience of understanding, the drawings illustrate that while changing from state (a) to state (b), the first gear 110 is rotated with the second gear 120 fixed, and while changing from state (b) to state (c), the first gear 110 is not rotated about its own axis but is rotated together with the second gear 120 since the first stopper 111 is supported by the steering shaft 101 or the second gear 120. However, it should be noted that rotation of the first gear 110 and rotation of the second gear 120 may be simultaneously performed.

As described above, the rotation range of the steering shaft 101 is determined by a relative rotation range between the steering shaft 101 and the first gear 110 and a relative rotation range between the second gear 120 and the housing 130. By the relative rotation between the steering shaft 101 and the first gear 110, state (a) of FIG. 4 is changed into state (b) and, by the relative rotation between the second gear 120 and the housing 130, state (b) of FIG. 4 is changed into state (c).

In other words, the rotation range of the steering shaft 101 may be represented as the sum of the range in which the steering shaft 101 is rotated until the first stopper 111 is supported by the steering shaft 101 (or the second gear 120) and the range in which the steering shaft 101 is rotated until the second stopper 121 is supported by the third stopper 131.

In other words, since part of the rotation range of the steering shaft 101 results from the relative rotation between the second gear 120 and the housing 130, it is possible to adjust the maximum steering angle of the steering wheel by changing the rotation range of the second gear 120 about the housing 130.

The maximum steering angle of the steering wheel may be designed to differ by changing the diameter of the gear. However, changing the specifications of parts, such as changing the diameter of the gear, results in a change in the overall size of the steering device and hence the need for producing parts with different specifications, which is inefficient. In particular, it is very hard to change the maximum steering angle after the steering device is installed in the vehicle.

However, according to the present embodiments, it is possible to simply adjust the rotation range of the second gear 120 about the housing 130 by changing the position or shape of the second stopper 121 and the third stopper 131. Therefore, it is possible to simply adjust the maximum steering angle although the steering device is designed with parts having the same specifications. Further, even the steering device is installed in the vehicle, the maximum steering angle may be appropriately changed as necessary.

FIGS. 1 to 4 illustrate an embodiment in which three second stoppers 121 and third stoppers 131 are arranged at equal intervals. It is possible to simply change the maximum steering angle of the steering wheel by changing the shape, number, or placement of the second stopper 121 or the third stopper 131 as shown in FIGS. 5 to 8. As described above, as the second stopper 121 is replaceably coupled to the second gear 120, or the third stopper 131 is replaceably coupled to the housing 130, and the second gear 120 provides various coupling positions to the second stopper 121 or the housing 130 provides various coupling positions to the third stopper 131, it is possible to simply change the gap between the second stopper 121 and the third stopper 131.

It is possible to adjust the rotation range of the second gear 120 about the housing by changing the position in which the second stopper 121 is provided on the second gear 120 or the position in which the third stopper 131 is provided in the housing 130.

Figure 5:
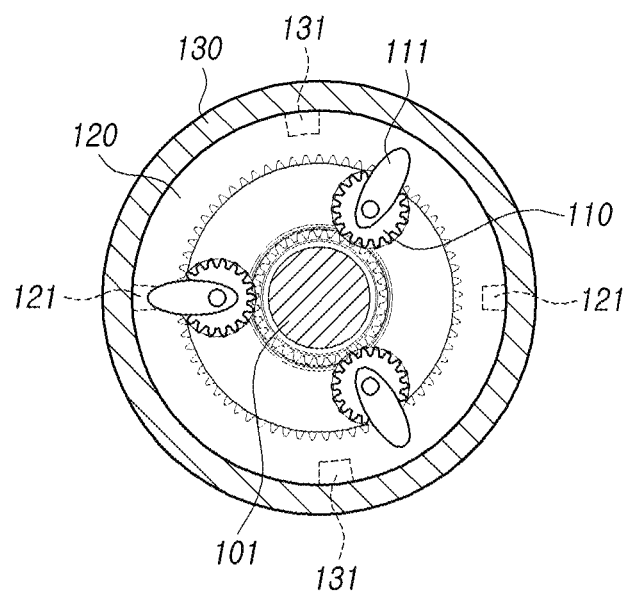
FIGS. 5, 6, 7, and 8 are front views illustrating a steer-by-wire steering device according to the present embodiments.

FIG. 5 illustrates an embodiment in which a pair of second stoppers 121 facing each other and a pair of third stoppers 131 facing each other are provided so that the rotation range of the second gear 120 about the housing 130 is increased as compared with that in the embodiment shown in FIGS. 1 to 4.

Figure 6:
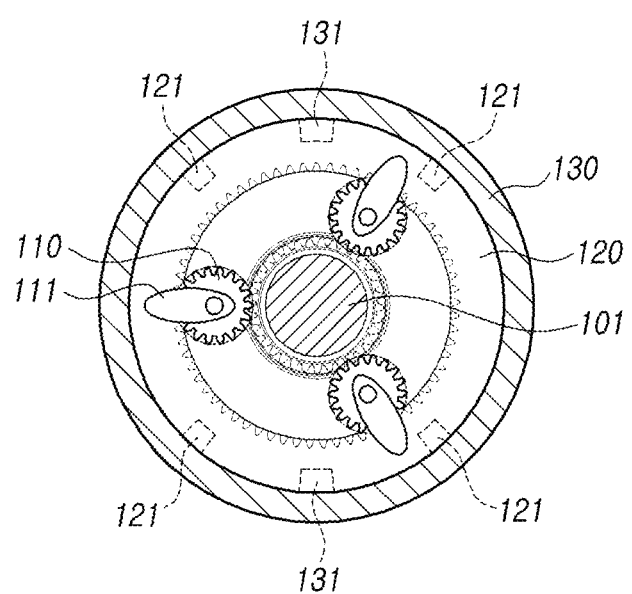

FIG. 6 illustrates an embodiment in which a pair of third stoppers 131 facing each other is provided, and pairs of second stoppers 121, each pair being positioned with each third stopper 131 disposed therebetween, are provided, so that the rotation range of the second gear 120 about the housing 130 is reduced as compared with that in the embodiment shown in FIGS. 1 to 4.

As such, a plurality of second stoppers 121 circumferentially spaced apart from each other are provided while a third stopper 131 is positioned between the second stoppers 131, or a plurality of third stoppers 131 circumferentially spaced apart from each other are provided while a second stopper 121 is positioned between the third stoppers 131. It is possible to provide the optimal maximum steering angle by finely adjusting the interval between the second stopper 121 and the third stopper 131.

Further, it is possible to adjust the rotation range of the second gear 120 about the housing 130 by changing the circumferential width of the second stopper 121 or the circumferential width of the third stopper 131.

Figure 7:
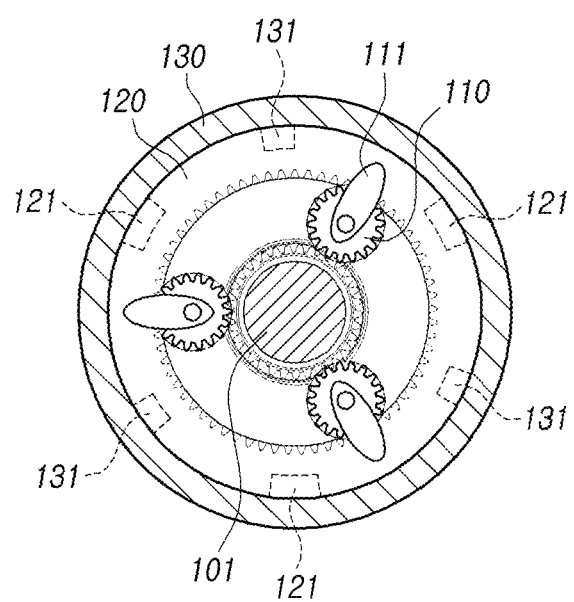

FIG. 7 illustrates an embodiment in which the second stopper 121 with a larger circumferential width than that in the embodiment shown in FIGS. 1 to 4 is provided, so that the rotation range of the second gear 120 about the housing 130 is reduced. FIG. 8 illustrates an embodiment in which the third stopper 131 with a larger circumferential width than that in the embodiment shown in FIGS. 1 to 4 is provided, so that the rotation range of the second gear 120 about the housing 130 is reduced.

The second stopper 121 and the third stopper 131 are not limited in arrangement, shape, and number, to the illustrated drawings, but may rather be appropriately designed and disposed as necessary.

Referring to FIG. 11, according to the present embodiments, the steering device 100 may further include a motor 1101 for rotating the housing 130. Although the drawings illustrate an embodiment in which the motor shaft of the motor 1101 is directly coupled with the housing 130, the motor 1101 and the housing 130 may be connected to each other via a reducer, e.g., a gear or pulley and belt.

The motor 1101 may rotate the housing 130 to adjust the interval between the second stopper 121 and the third stopper 131, so that the maximum steering angle of the steering wheel may be adjusted by the control of the motor 1101.

In other words, an electronic control unit (not shown) provided in the vehicle may control the motor 1101 to rotate the housing 130, thereby changing the interval between the second stopper 121 and the third stopper 131 and adjusting the maximum steering angle of the steering wheel. The adjustment of the maximum steering angle of the steering wheel by the motor 1101 may be performed in real-time, providing the driver with the optimal steering feel.

FIG. 12 illustrates an embodiment in which the motor 1101 rotates the housing 130 according to the direction in which the driver manipulates the steering wheel to reduce the interval between the second stopper 121 and the third stopper 131, thereby increasing the maximum steering angle. In contrast, the maximum steering angle may be increased by increasing the interval between the second stopper 121 and the third stopper 131.

The adjustment of the maximum steering angle by the motor 1101 may be varied depending on the driving mode of the vehicle. For example, in comport mode, the maximum steering angle may be controlled to be relatively increased and, in sports mode, the maximum steering angle may be controlled to be relatively reduced.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steer-by-wire steering device, comprising:
 a steering shaft having gear teeth on an outer circumferential surface thereof;
 a first gear rotated in engagement with the gear teeth of the steering shaft;
 a second gear having an inner circumferential surface engaged with the first gear;
 a housing supporting rotation of the second gear;
 a first stopper provided on the first gear and supported by the steering shaft or the second gear as the first gear rotates;
 at least one second stopper provided on the second gear; and
 at least one third stopper provided in the housing and supporting the second stopper as the second gear rotates.

2. The steer-by-wire steering device of claim 1, wherein the first stopper includes an end radially protruding beyond an outer circumferential surface of the first gear.

3. The steer-by-wire steering device of claim 1, wherein the second stopper is formed to axially protrude from the second gear.

4. The steer-by-wire steering device of claim 1, wherein the third stopper is formed to protrude from an inner circumferential surface of the housing.

5. The steer-by-wire steering device of claim 1, wherein a rotation range of the second gear about the housing is adjustable.

6. The steer-by-wire steering device of claim 5, wherein a position in which the second stopper is provided on the second gear is changeable.

7. The steer-by-wire steering device of claim 5, wherein a position in which the third stopper is provided in the housing is changeable.

8. The steer-by-wire steering device of claim 5, wherein a circumferential width of the second stopper is changeable.

9. The steer-by-wire steering device of claim 5, wherein a circumferential width of the third stopper is changeable.

10. The steer-by-wire steering device of claim 5, wherein a plurality of second stoppers circumferentially spaced apart from each other are provided, and the third stopper is positioned between the second stoppers.

11. The steer-by-wire steering device of claim 5, wherein a plurality of third stoppers circumferentially spaced apart from each other are provided, and the second stopper is positioned between the third stoppers.

12. The steer-by-wire steering device of claim 1, further comprising a motor for rotating the housing.

* * * * *